(12) United States Patent
Willis

(10) Patent No.: US 8,905,845 B2
(45) Date of Patent: Dec. 9, 2014

(54) GAMING CONTROLLER SYSTEM

(71) Applicant: Matthew Willis, Bloomington, MN (US)

(72) Inventor: Matthew Willis, Bloomington, MN (US)

(73) Assignee: BBY Solutions, Inc., Richfield, MN (US)

( * ) Notice: Subject to any disclaimer, the term of this patent is extended or adjusted under 35 U.S.C. 154(b) by 7 days.

(21) Appl. No.: 13/798,570

(22) Filed: Mar. 13, 2013

(65) Prior Publication Data

US 2014/0274394 A1    Sep. 18, 2014

(51) Int. Cl.
*G06F 17/00* (2006.01)
*G06F 1/16* (2006.01)
*G06F 3/041* (2006.01)
*A63F 13/20* (2014.01)

(52) U.S. Cl.
CPC ............... *A63F 13/06* (2013.01); *G06F 3/041* (2013.01); *G06F 1/1601* (2013.01); *G06F 1/1632* (2013.01)

USPC ................... 463/36; 361/679.01; 361/679.11; 361/679.44; 463/37

(58) Field of Classification Search
None
See application file for complete search history.

(56) References Cited

U.S. PATENT DOCUMENTS

| | | | | |
|---|---|---|---|---|
| 6,115,247 A * | 9/2000 | Helot | ........................ | 361/679.44 |
| 7,733,637 B1 * | 6/2010 | Lam | ........................ | 361/679.11 |
| 2002/0155890 A1 * | 10/2002 | Ha et al. | ........................ | 463/36 |
| 2006/0067044 A1 * | 3/2006 | Yoshida et al. | ........................ | 361/686 |
| 2010/0025444 A1 * | 2/2010 | Tipton et al. | ........................ | 224/576 |
| 2010/0081505 A1 * | 4/2010 | Alten et al. | ........................ | 463/36 |

* cited by examiner

*Primary Examiner* — Dmitry Suhol
*Assistant Examiner* — Jason Yen
(74) *Attorney, Agent, or Firm* — Beck & Tysver PLLC

(57) ABSTRACT

A tablet computer interface with additional motion based sensors and tactile controls.

1 Claim, 3 Drawing Sheets

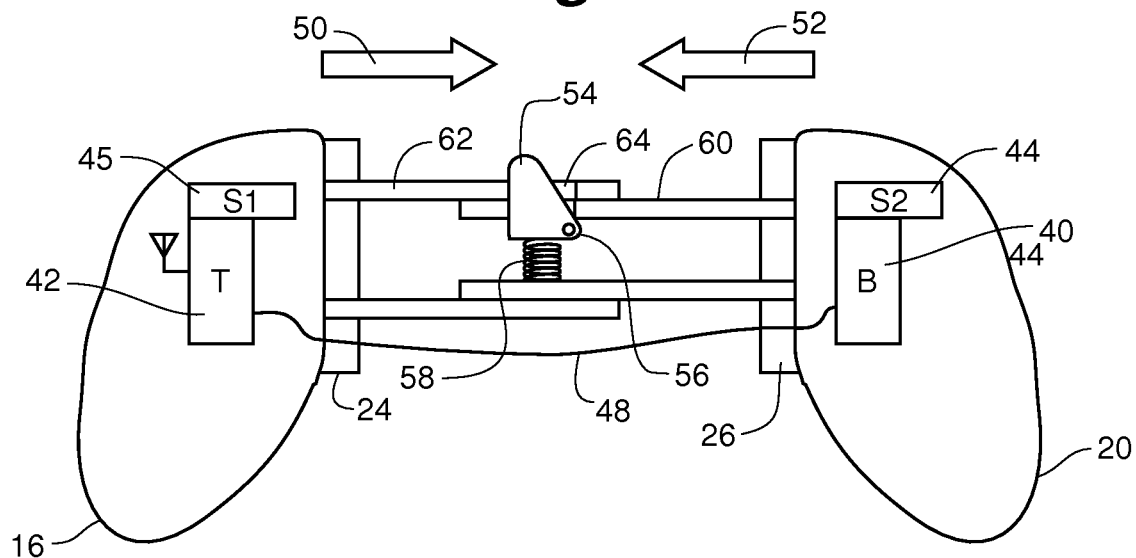
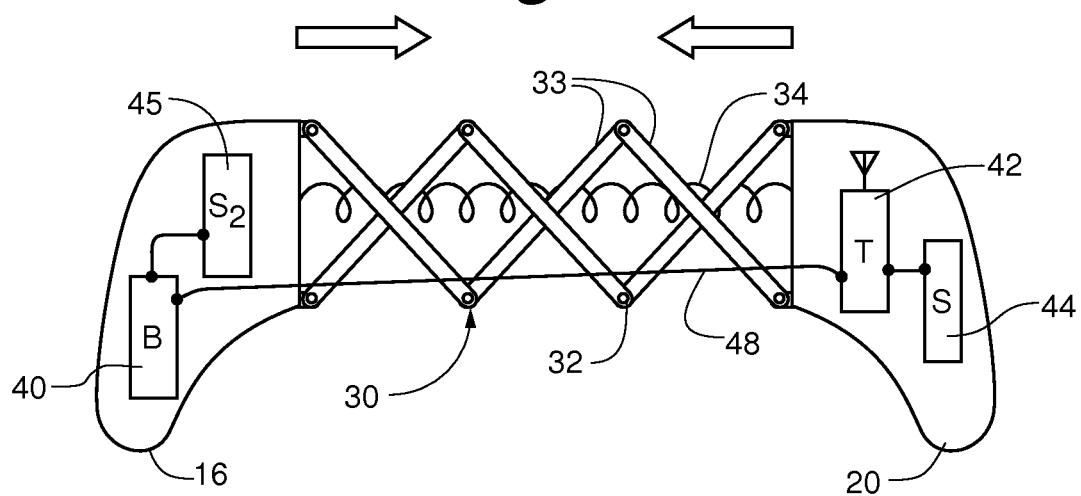

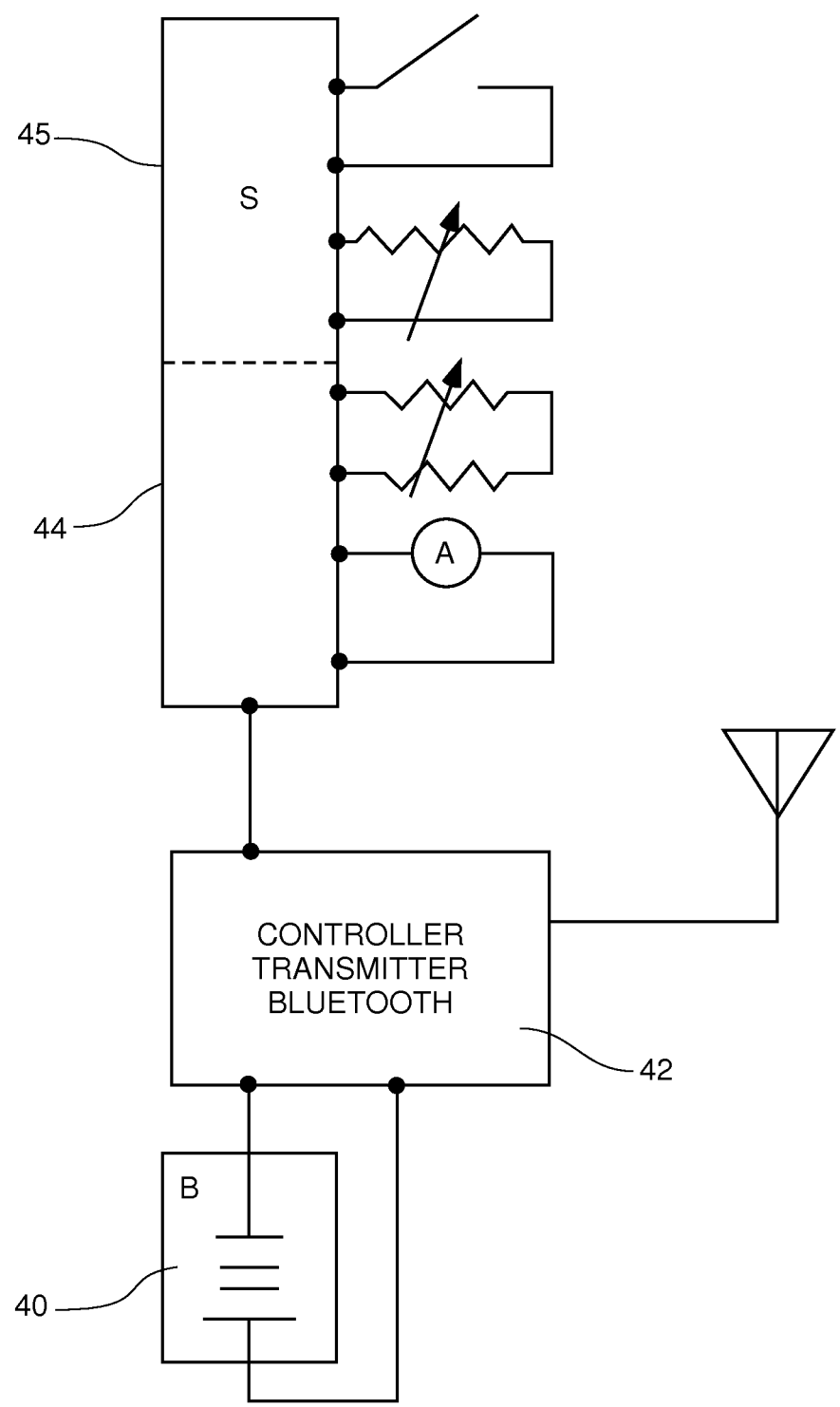

GAMING CONTROLLER SYSTEM

BACKGROUND OF THE INVENTION

Games played on tablet computers typically rely on the touch screen interface of the tablet device to interact with the user.

SUMMARY OF THE INVENTION

The present invention includes a gaming cradle for connection to a tablet computer. The gaming cradle includes an extendable framework securing a right-hand handle and a left-hand handle to a tablet computer. In use the tablet computer is captured by the framework and rigidly coupled to both the right-hand and left-hand handles.

A set of tactile feedback buttons or switches are located on the upper surface or lower surface of each handle. These buttons are arranged for finger actuation while the handles are griped by the user.

Gaming commands requested by the buttons are sent to the tablet via a Bluetooth connection transmitted by a battery-powered game interaction control transmitter located in one handle.

Preferably, the two handles are electrically coupled to each other via a cable integrated into the framework.

Preferably, the cradle is powered by batteries located within a first handle and the communication transmitter is located in the opposite handle.

Preferably, there is no wired connection from the cradle to the tablet computer.

DESCRIPTION OF THE DRAWINGS

Throughout the figures of the drawing like reference numerals indicate identical structure wherein:

FIG. 2 is a mechanical schematic describing a first implementation of the system;

FIG. 3 is a mechanical schematic describing a second implementation of the system; and, FIG. 4 is an electric schematic describing electronic portions of the system.

DETAILED DESCRIPTION

Figure 1:
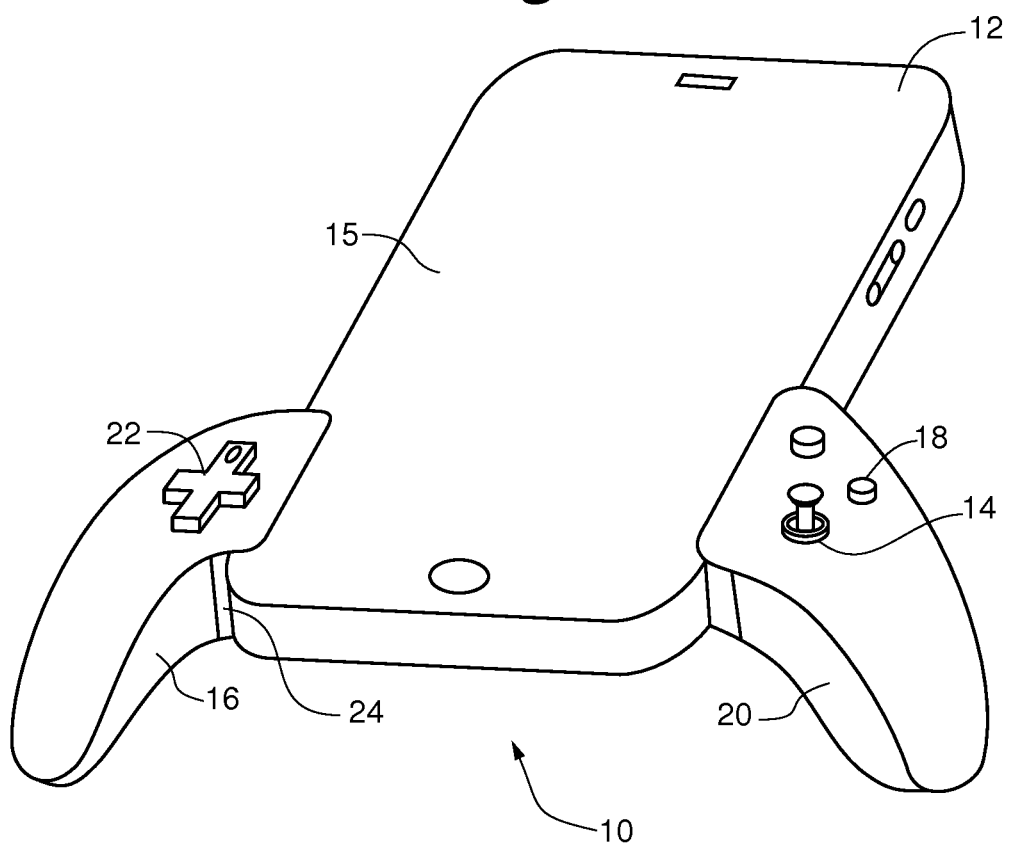
FIG. 1 is a perspective view of the gaming controller system.

FIG. 1 shows the overall gaming controller system assembly 10 connected to a tablet computer 12. In this embodiment the first handle or grip 16 is connected to the companion second handle or grip 20. In use the user adjusts the two grips to capture and contact the edges of the tablet computer 12. Next the user may grasp the grips 16, 20 and manipulate the switches typified by joystick 14, thumb switch 18 or individual button switches such as button 22.

By way of example, buttons 14, 18, 22 are placed on the upper or tablet screen side 15 of the grips 16, 20 for clarity of illustration. However the switches may be on the underside of the grips 16, 20 as well. By way of example, buttons 18, 22 may be placed on the lower or non-screen side of tablet computer 12. In this instance the shape of the grips 16, 20 is selected to permit grasping with a few fingers and the user's palms. In this type of configuration, fingers are free to actuate trigger-style buttons. Gamers may prefer this configuration for race type games. The shape of the grips 16, 20 may be selected to permit grasping with several fingers while leaving the thumbs free to interact with the buttons. Gamers may prefer this configuration for some energetic games.

FIG. 2 is a schematic view of the embodiment if FIG. 1 where the user squeezes the grips 16, 20 together, compressing elastomeric pad 24 and elastomeric pad 26 until a latching and locking feature is engaged. The motion arrows 50 and 52 depict the squeezing operation. The thumb lever 54 is pivotally mounted 56 within a tube 60 that slides within tube 62. The two tubes together form a telescoping assembly that can accommodate a range of tablet widths. The thumb lever 54 may engage and protrude through a notch or hole 64 in the two tubes 60, 62, thus locking them at a fixed distance. The spring feature 58 biases the thumb lever 54 into the locked position.

FIG. 2 also shows an illustrative placement of batteries 40 in grip 20 along with some switches 44. The Bluetooth transmitter controller 42 resides in the opposite grip 16. A cable 48 connects the portioned electronic assemblies.

FIG. 3 shows an alternative implementation where there is a lattice like framework 30 composed of crisscrossing elements 33 pivoting about an axis 32. In this embodiment, a restoring force is supplied by a spring typified by spring element 34 shown in phantom view. In use the user expands the framework 30 and inserts the tablet computer 12, allowing the framework 30 to capture and retain the tablet computer 12 under the force of the spring 34.

FIG. 4 shows a simplified schematic block diagram of major electronic elements of the system. In any of the embodiments of FIGS. 1-3, the electronics package comprising batteries 40 and game communication transmitter 42 coupled together and interfaced with a switch array 44. The preferred placement puts the batteries 40 together in one handle or grip and the remaining components in the companion grip. An appropriate cable 48 connects the portioned components.

Although buttons activated by fingers or thumbs are the primary control point, accelerometers and or pressure sensors may be including within the grips offering nontraditional interaction with the game.

I claim:

1. A gaming cradle for a tablet computer of the type having a touch screen interface, the gaming cradle comprising:
   a. a first tube and a second tube, where the first tube is inserted into the second tube forming a telescopic tube assembly;
   b. a thumb lever pivotally mounted in said telescopic tube assembly to protrude through at least one hole in said telescopic tube assembly;
   c. a left handle and a right handle; each of said handles coupled to said telescopic tube assembly, for grasping said tablet computer;
   d. first and second elastomeric pads attached to said handles for frictional engagement with said tablet computer;
   e. at least one of a button, a switch, and a joystick located on at least one of said grips;
   f. a cable connecting the left handle and the right handle;
   g. an electronics package having a Bluetooth transmitter; and
   a battery providing power to the electronics package located in at least one of said grips, whereby switch activation is transmitted to said tablet computer.

* * * * *

UNITED STATES PATENT AND TRADEMARK OFFICE
CERTIFICATE OF CORRECTION

| | | |
|---|---|---|
| PATENT NO. | : 8,905,845 B2 | Page 1 of 1 |
| APPLICATION NO. | : 13/798570 | |
| DATED | : December 9, 2014 | |
| INVENTOR(S) | : Matthew Willis | |

It is certified that error appears in the above-identified patent and that said Letters Patent is hereby corrected as shown below:

Specification

Column 2, Line 38 (approx.)
Delete "and or" and insert --and/or--, therefor.

Signed and Sealed this
Twenty-ninth Day of December, 2015

Michelle K. Lee
*Director of the United States Patent and Trademark Office*